Jan. 10, 1961
A. HOFFMANN
2,967,739
DAMAGE-PROOF JOURNALLING OF BEARINGS
FOR RAPIDLY ROTATING SHAFTS
Filed Jan. 2, 1959
2 Sheets-Sheet 1
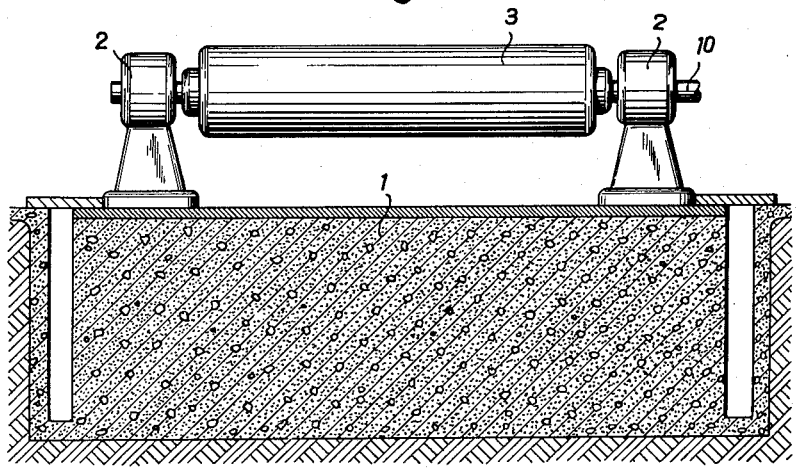
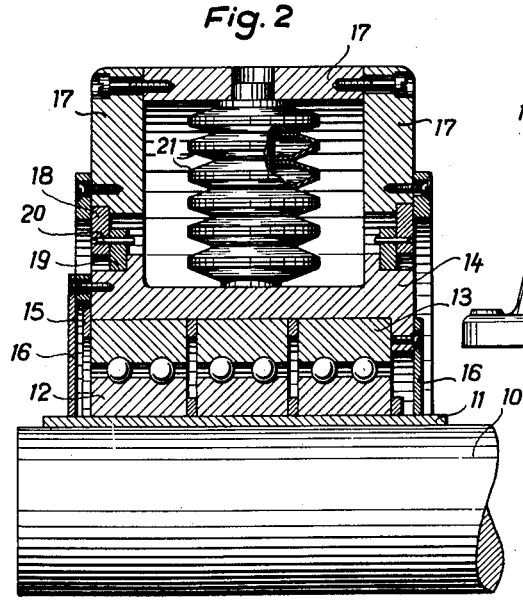
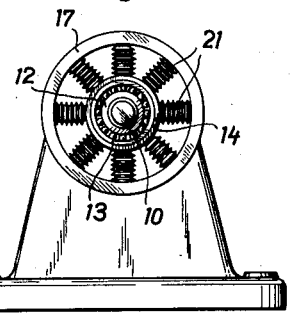
INVENTOR
August Hoffmann
By [signature]
Att'y.

United States Patent Office 2,967,739
Patented Jan. 10, 1961

2,967,739

DAMAGE-PROOF JOURNALLING OF BEARINGS FOR RAPIDLY ROTATING SHAFTS

August Hoffmann, Sigismundkorso 75 (II), Berlin-Frohnau, Germany

Filed Jan. 2, 1959, Ser. No. 784,617

Claims priority, application Germany Jan. 23, 1958

12 Claims. (Cl. 308—1)

This invention is concerned with damage-proof journalling of bearings for rapidly rotating shafts of machine parts subjected to rotation on a safety test stand.

A previously proposed safety test stand for rapidly rotating machine parts, especially for inductors of turbo generators comprises a relatively thick casing surrounding the element to be tested in the manner of a cylindrical envelope with an inner diameter close to the outer diameter of the corresponding element save for a relatively small air gap. Responsive to deformation, the element to be tested, after passing across this very small gap, engages the inner wall of the casing and rolls therealong, thereby producing frictional forces of considerable magnitude. These forces impart rotation to the casing which may be rotatably journalled. The kinetic energy of the element undergoing testing is quickly dissipated by the friction and by the rotation of the casing, thus causing reduction of the speed of rotation of the corresponding element.

It is in this manner possible to prevent explosion of an inductor due respectively to centrifugal forces and unbalance, but the radially directed forces can seriously damage the bearings of the inductor and make them unfit for use.

The invention is concerned with journalling in damage-proof manner bearings for rapidly rotating shafts of sundry machine parts, especially shafts of electrical machines subjected to testing on safety test stands. The characteristic feature of the invention resides in the provision of an inner casing or cage which encloses the bearing and which is connected with an outer casing or cage part by spring means and rupture members in such a manner that the spring means become operatively effective upon rupture of the rupture members so as to cause the shaft to assume a new position.

The various objects and features of the invention will become apparent from the following description to be read with reference to the accompanying drawings.

In the drawings:

Fig. 1 shows the manner of journalling a machine part to be tested;

Figs. 2 and 3 illustrate an embodiment of the journalling in sectional view and in end view, respectively.

Figure 4:
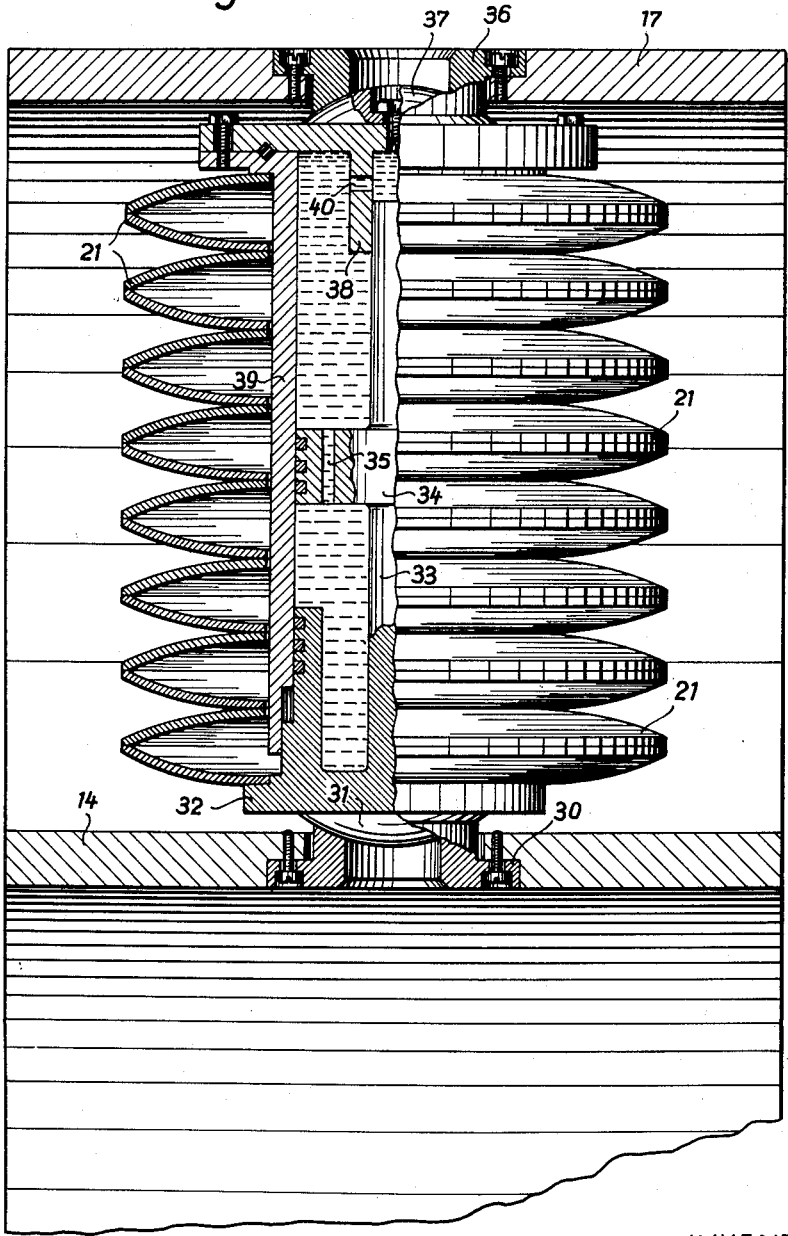
Fig. 4 shows a stack of spring means employed for the journalling and provided with hydraulic damping.

Referring now to Fig. 1, numeral 1 indicates a foundation carrying journal or bearing means 2 for a machine part 3 which is to be tested. Such machine part may be the inductor of a turbo generator. In a previously proposed safety test stand, the inductor may be surrounded by a massive casing in the form of a cylindrical structure, providing for a relatively small air gap between the inner wall of the surrounding casing and the outside of the inductor. This surrounding casing has been omitted in Fig. 1 for the sake of simplicity of representation.

In case an unbalance occurs incident to the centrifuging of the machine part undergoing testing, the machine part will move across the small air gap and engage the inner wall of the surrounding casing, whereby the radially directed forces will be converted into tangentially directed frictional forces which will result in quick braking and reduction of the speed of rotation. However, even small positional changes can cause damage or destruction of the bearing 2, and the invention therefore proposes a particular manner of journalling the bearing means which shall now be described with reference to Figs. 2 and 3.

Referring now to Figs. 2 and 3, numeral 10 indicates a portion of the shaft of the machine part undergoing testing, a tensioned bushing 11 being provided on the shaft. Upon the bushing 11 are fastened inner bearing races 12 cooperating with a corresponding number of outer bearing races 13. The bearings comprising the respective bearing races 12 and 13 are held in position by means of a casing or cage 14. All parts so far described form with the shaft 10 an operating unit which is in accordance with the invention so constructed that deformation and especially damage to the bearings is avoided incident to occurrence of unbalance during the centrifuging operation. An annular laterally disposed member 15 holds the bearing races 12, 13 in position with respect to the cage 14. A cover plate 16 is provided at each end o protect the bearings against ingress of contaminations.

Numeral 17 indicates an outer cage member which is advantageously made of several parts so as to facilitate assembly operations. The inner cage 14 and the outer cage part 17 are held together by means of rings 18, 19, these rings being respectively fixedly connected with the cage members 17 and 14. The two rings 18, 19 are held together by rupture or shear pins 20. Between the inner cage 14 and the outer cage assembly 17 are disposed stacks of disk or plate-shaped springs 21. A plurality of such spring stacks is provided, the respective stacks extending radially, so that radially directed forces may be absorbed thereby regardless of the angular section along which they may occur.

The above noted plate or disk-shaped springs are practically ineffective during a balancing operation of an inductor. However, in case bearing loads occur, for example, due to sudden unbalance and/or due to excessive speed of rotation, which exceed the rated loads for the bearings 12, 13, such loads will cause rupture of the shear pins 20. The cross-sectional areas of these pins are dimensioned so that the force required for the rupture thereof is considerably smaller than the force that would be required for damaging or destroying the bearings. Responsive to rupture of the shear pins 20 belonging to any one or more spring stack assemblies, the conductor undergoing testing, due to the unbalance and the elastic journalling will assume a new position with an axis of rotation which differs from the original position and which depends upon the magnitude and direction of the unbalance. The characteristic feature of this new position is that radially directed dangerous forces are compensated by oppositely acting forces. The rings 18, 19 which are interconnected by means of the shear pins 20 are advantageously disposed so that the shaft 10 as a whole can execute a pivotal motion about the center of the bearing at the other end of the inductor.

The structure according to the invention provides particularly in connection with test stands increased security against accidents due to explosion in that the initially rigid journalling of the body to be respectively balanced or centrifuged is converted into elastic journalling. A further safety factor resides in the feature according to which the body undergoing testing is responsive to suddenly occurring unbalance caused to roll in engagement with the inside of the cylindrical casing which surrounds it closely spaced therefrom. The torque exerted on the surrounding cylindrical casing by the body being tested is subjected to reactive braking by the action of the concentrically disposed cylindrical inside wall surface of the surrounding casing. The surrounding casing may be rotated in the same sense of rotation as the body undergoing testing so as to contribute further to security and reliability of operation. The corresponding measures may be applied individually or in common.

Desired and suitable indicating or signalling means may be provided for indicating a condition in which permissible bearing reaction forces are exceeded. For example, the piezo electric effect may be utilized for indicating the bearing reaction forces.

Fig. 4 shows for use in the structure according to Figs. 2 and 3 an example of a plate spring stack in which hydraulic braking is utilized in addition to the damping effected by the disk or plate-like springs, for absorbing radially directed shaft displacement. The hydraulic brake means is advantageously disposed centrally of the respective plate spring stacks. The use of such stack structures will quickly arrest radial displacement of the shaft and hold it in its new position.

Numeral 14 in Fig. 4 indicates a portion of the inner bearing casing or cage which surrounds the bearing races as explained with reference to Figs. 2 and 3 and numeral 17 indicates part of the corresponding outer cage. The inner and outer cage parts 14 and 17 are interconnected by means of rings such as 18, 19 and rupture pins such as 20, all as explained in connection with Figs. 2 and 3. These parts have been omitted from Fig. 4 to keep it simple, only a stack 21 of plate-like springs being shown disposed between the inner and outer cage parts 14 and 17. Several such spring stacks are provided as previously explained.

In accordance with the invention, and as shown in Fig. 4, an insert 30 is provided in the inner or lower bearing cage part 14 for supporting a calotte 31 which is part of a cylinder member 32 from which extends a piston rod 33 carrying a piston 34. The piston is provided with several bores 35 formed therein and extending in parallel to the cylinder axis, the bores serving the purpose of permitting passage of the brake fluid.

An insert similar to the insert 30 is provided in the outer or upper cage part 17, as indicated at 36, for supporting a calotte 37 which is part of an inner cylinder 38 for slidably receiving the upper end of the piston rod 33. The inserts 30 and 36 may be respectively secured to the inner cage 14 and the outer cage assembly 17, by screws, as shown in Fig. 4. While slotted screws are illustrated for convenience, preferably the screws are either hexagonally headed machine bolts or hexagonally recessed cap screws. The calotte 37 has a flanged portion forming the cover for a further cylinder 39, for slidably accommodating the piston 34. The cylinder 39 also accommodates the cylinder part 32. The inner cylinder 38 is provided with bores 40 formed therein, such bores serving the purpose of permitting passage of the brake fluid.

As has been said before, a plurality of stack structures such as shown in Fig. 4 are provided and extending radially of the bearing so that the shaft with the inner bearing cage 14 is in all directions sufficiently supported.

The operation corresponds generally to that already explained with reference to Figs. 2 and 3. Responsive to positional changes of the shaft, for example, due to exceeding a maximum speed of rotation or due to appearance of an unbalance, the inner bearing cage part 14 will move radially, for example, upwardly as seen in Fig. 4, it being of course assumed that the corresponding holding members have ruptured as described before. The plate-like springs 21 oppose and dampen this motion. The hydraulic brake means also counteracts this motion due to coincident upward motion of the structure including the calotte 31, the cylinder 32, piston rod 33 and piston 34. The brake fluid is thereby through the various bores or passages 40, 35 displaced from the upper to the lower areas of the structure or vice versa, depending upon the direction of motion according to the radial displacement of the shaft. The hydraulic brake action contributes to the damping of the motion effected by the plate-like springs which provide damping due to air displacement in the spaces between the various pairs of spring plates arranged as shown and described.

Changes may be made within the scope and spirit of the appended claims which define what is believed to be new and desired to have protected by Letters Patent.

I claim:

1. A damage-proof journal for rapidly rotating machine shafts, comprising bearing means for a shaft to be rotated, inner bearing cage means embracing said bearing means, outer bearing cage means radially spaced from said inner bearing cage means, spring means disposed between said inner and outer bearing cage means, means independent of said spring means for rigidly interconnecting said inner and outer bearing cage means, said interconnecting means being subject to rupture responsive to radial pressure resulting from corresponding radial displacement of said shaft, said rupture releasing said inner bearing cage means relative to said spring means for movement radially in any direction with respect to said outer bearing cage means against the pressure of said spring means, thereby allowing said shaft to move radially into a position according to the displacement thereof and be supported by said spring means.

2. A structure and cooperation of parts according to claim 1, comprising a bushing carried by said shaft, said bearing means including an inner race carried by said bushing and an outer race disposed in engagement with said inner bearing cage means.

3. A structure and cooperation of parts according to claim 2, wherein said outer bearing cage means surrounds said inner bearing cage means, and a plurality of radially extending plate-like spring stacks disposed between said inner and outer bearing cage means.

4. A structure and cooperation of parts according to claim 3, comprising holding ring means respectively connected with said inner and outer bearing cage means, and shear pins constituting said interconnecting means and extending between said holding ring means.

5. A structure and cooperation of parts according to claim 4, wherein said shear pins are dimensioned so that the force required for the rupture thereof is considerably smaller than the force required for damaging the bearing means.

6. A structure and cooperation of parts according to claim 3, wherein said plate-like spring stacks exert a force adapted to dampen the radial displacement thereof, and hydraulic brake means operatively disposed between said inner and outer bearing cage means for additionally counteracting the radial displacement of said shaft.

7. A damage-proof journal for rapidly rotating machine shafts, comprising bearing means for a shaft to be rotated, bearing cage means embracing said bearing means, outer bearing cage means surrounding said inner bearing cage means in radially spaced relation, a bushing carried by said shaft, said bearing means including an inner race carried by said bushing and an outer race disposed in engagement with said inner bearing cage, a plurality of radially extending plate-like spring stacks disposed between said inner and outer bearing cage means, means for interconnecting said inner and outer bearing cage means, said interconnecting means being subject to rupture responsive to radial pressure resulting from corresponding radial displacement of said shaft, said rupture releasing said inner bearing cage means to move radially with respect to said outer bearing cage means against the pressure of said spring means thereby allowing said shaft to move radially into a position according to the displacement thereof with said plate-like spring stacks exerting a force adapted to dampen the radial displacement thereof, and hydraulic brake means disposed centrally of the respective plate-like spring stacks and extending between said inner and outer bearing cage means for additionally counteracting the radial displacement of said shaft.

8. A structure and cooperation of parts according to claim 7, wherein said hydraulic brake means comprises two mutually relatively displaceable cylinders.

9. A structure and cooperation of parts according to claim 8, comprising a first cylinder from which extends a piston rod carrying a piston, a second cylinder in which said piston is movably disposed, bores being formed in said piston to provide intercommunication between the cylinder spaces delimited thereby.

10. A structure and cooperation of parts according to claim 9, comprising an auxiliary cylinder extending within said second cylinder, the end of said piston rod being movably disposed in said auxiliary cylinder.

11. A structure and cooperation of parts according to claim 10, wherein bores are formed in the wall of said auxiliary cylinder to provide intercommunication with said second cylinder.

12. A structure and cooperation of parts according to claim 11, comprising calotte means for respectively supporting said cylinders in connection with said inner and outer bearing cage means.

References Cited in the file of this patent

UNITED STATES PATENTS

| | | |
|---|---|---|
| 1,916,897 | Solem | July 4, 1933 |
| 2,487,343 | Kopf | Nov. 8, 1949 |
| 2,665,128 | Guffey | Jan. 5, 1954 |

FOREIGN PATENTS

| | | |
|---|---|---|
| 244,766 | Great Britain | Sept. 9, 1926 |